US010826966B2

(12) United States Patent
Suriarachchi et al.

(10) Patent No.: US 10,826,966 B2
(45) Date of Patent: Nov. 3, 2020

(54) SCHEDULING AND CONCURRENT PROCESSING OF PROTOCOL TRANSACTIONS

(71) Applicant: ServiceNow, Inc., Santa Clara, CA (US)

(72) Inventors: Amila Suriarachchi, San Diego, CA (US); Wei Rui, San Diego, CA (US); Matthew Stoddart, San Diego, CA (US); Kyle Barron-Kraus, San Diego, CA (US)

(73) Assignee: ServiceNow, Inc., Santa Clara, CA (US)

(*) Notice: Subject to any disclaimer, the term of this patent is extended or adjusted under 35 U.S.C. 154(b) by 204 days.

(21) Appl. No.: 15/903,251

(22) Filed: Feb. 23, 2018

(65) Prior Publication Data

US 2019/0268398 A1 Aug. 29, 2019

(51) Int. Cl.
*H04L 29/06* (2006.01)
*H04L 29/08* (2006.01)

(52) U.S. Cl.
CPC .......... *H04L 67/02* (2013.01); *H04L 65/1003* (2013.01); *H04L 69/02* (2013.01)

(58) Field of Classification Search
USPC .................................................. 709/227–229
See application file for complete search history.

(56) References Cited

U.S. PATENT DOCUMENTS 5,781,910 A * 7/1998 Gostanian ............. G06F 11/202
707/610
9,268,834 B2 2/2016 Aguilera et al.
2009/0199210 A1 * 8/2009 Smith, Jr. ............... H04L 67/02
719/315
2016/0085639 A1 * 3/2016 Abouzour ........... G06F 16/2308
707/648
2016/0210344 A1 * 7/2016 Bourbonnais ........... G06F 16/23
(Continued)

OTHER PUBLICATIONS

Inbound integrations performance design on the ServiceNow platform, Feb. 19, 2018 (downloaded from public web site https://community.servicenow.com/community?id=community_article&sys_id=213ce661dbd0dbc01dcaf3231f9619be).

(Continued)

*Primary Examiner* — Younes Naji
*Assistant Examiner* — Da T Ton
(74) *Attorney, Agent, or Firm* — Fletcher Yoder PC

(57) ABSTRACT

A computing system may be configured to store a master session context of a HyperText Transfer Protocol (HTTP) session, and a queue of HTTP transactions. A middleware module of the computing system may be executable by the processor to: (i) select a first HTTP transaction from the queue, (ii) execute an exclusive phase of the first HTTP transaction, including copying the master session context into a first local session context, (iii) cause a web server to execute a non-exclusive phase of the first HTTP transaction using a first thread and the first local session context, (iv) select a second HTTP transaction from the queue, and (v) execute an exclusive phase of the second HTTP transaction, including copying the master session context into a second local session context. Execution of the exclusive phase of the second HTTP transaction and the execution of the non-exclusive phase of the first HTTP transaction occur concurrently.

24 Claims, 15 Drawing Sheets

(56) References Cited

U.S. PATENT DOCUMENTS

2016/0321296 A1* 11/2016 Kakivaya .............. G06F 16/275
2017/0097955 A1* 4/2017 Chen ................. G06F 16/24554

OTHER PUBLICATIONS

ServiceNow Documentation, Jan. 22, 2018 (downloaded from public web site https://docs.servicenow.com).

13 reasons why the stats.do page is your best friend for troubleshooting, Jan. 23, 2018 (downloaded from public web site https://community.servicenow.com/community/service-automation-platform/blog/2017/07/06/just-another-statistic 1/).

What is a Servlet Container?, Jan. 23, 2018 (downloaded from public web site https://dzone.com/articles/what-servlet-container).

* cited by examiner

SCHEDULING AND CONCURRENT PROCESSING OF PROTOCOL TRANSACTIONS

BACKGROUND

The World-Wide Web is the predominant method of accessing digital information. The transport mechanism underlying the web is the HyperText Transfer Protocol (HTTP). Initially supporting only static web page content, the web has grown over the years to support a combination of static and dynamically-generated content. HTTP has evolved as well, now supporting sessions that may involve one or more distinct transactions. Each of these transactions may encompass a web server receiving an HTTP request from a web client (e.g., a browser), parsing this request, processing the parsed request, generating a response, and transmitting the response (typically in the form of a web page) to the web client. Delivering large web pages may involve handling multiple HTTP transactions per session, perhaps dozens or more. Current middleware infrastructure that supports these procedures may be unable to handle more than one such HTTP transaction per session at a time. As a consequence, delivery of a full web page may be unnecessarily delayed.

SUMMARY

Infrastructure middleware that is not thread safe may prevent concurrent processing of HTTP transactions per HTTP session. The embodiments herein specify a number of improvements to such middleware in order to make it thread safe, resulting in support for the simultaneous execution of multiple HTTP transactions within a single HTTP session. As a result, the load time of web pages, as experienced by users or non-user entities requesting these pages, can be reduced. These improvements can be implemented in middleware that is below the web server in a protocol stack, or as part of the web server.

Accordingly, a first example embodiment may involve a computing system. The computing system may include a processor and a memory configured to store a master session context of an HTTP session, a queue of HTTP transactions associated with the HTTP session, and a representation of a plurality of threads. The computing system may also include a web server software application, executable by the processor to perform the HTTP transactions using the plurality of threads, and a middleware software module executable by the processor to: (i) select a first HTTP transaction from the queue, (ii) execute an exclusive phase of the first HTTP transaction, including: copying, for the first HTTP transaction, the master session context into a first local session context, and allocating, for the first HTTP transaction, a first thread of the plurality of threads, (iii) cause the web server to execute a non-exclusive phase of the first HTTP transaction using the first thread and the first local session context, where execution of the non-exclusive phase of the first HTTP transaction includes: parsing a first HTTP request associated with the first HTTP transaction and generating a first HTTP response to the first HTTP request, (iv) select a second HTTP transaction from the queue, and (v) execute an exclusive phase of the second HTTP transaction, including: copying, for the second HTTP transaction, the master session context into a second local session context, and allocating, for the second HTTP transaction, a second thread from the plurality of threads. The execution of the exclusive phase of the second HTTP transaction and the execution of the non-exclusive phase of the first HTTP transaction may occur concurrently.

A second example embodiment may involve selecting a first HTTP transaction from a queue of HTTP transactions associated with an HTTP session, where the HTTP session is associated with a master session context. The second example embodiment may also involve executing an exclusive phase of the first HTTP transaction, including: copying, for the first HTTP transaction, the master session context into a first local session context, and allocating, for the first HTTP transaction, a first thread of a plurality of threads. The second example embodiment may also involve causing a web server to execute a non-exclusive phase of the first HTTP transaction using the first thread and the first local session context. Execution of the non-exclusive phase of the first HTTP transaction may include: parsing a first HTTP request associated with the first HTTP transaction and generating a first HTTP response to the first HTTP request. The second example embodiment may also involve selecting a second HTTP transaction from the queue. The second example embodiment may also involve executing an exclusive phase of the second HTTP transaction, including: copying, for the second HTTP transaction, the master session context into a second local session context, and allocating, for the second HTTP transaction, a second thread from the plurality of threads. The execution of the exclusive phase of the second HTTP transaction and the execution of the non-exclusive phase of the first HTTP transaction may occur concurrently.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
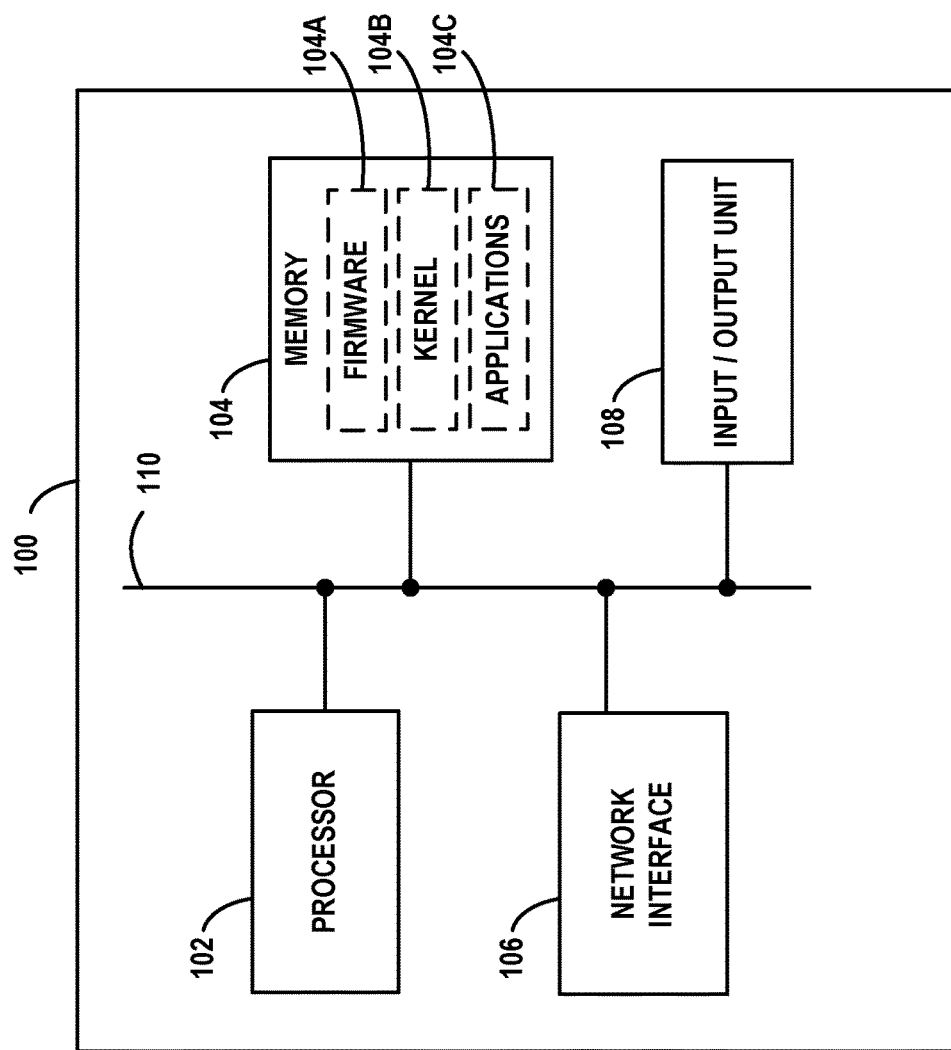
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
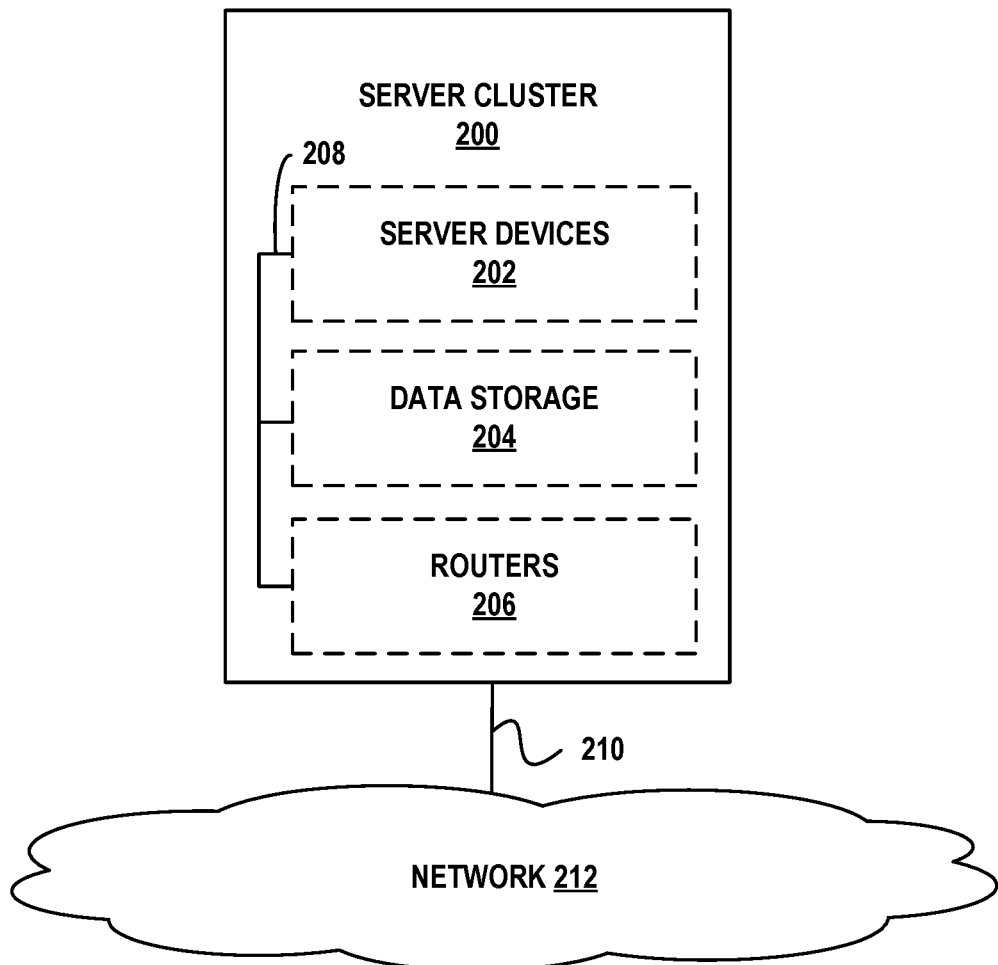
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
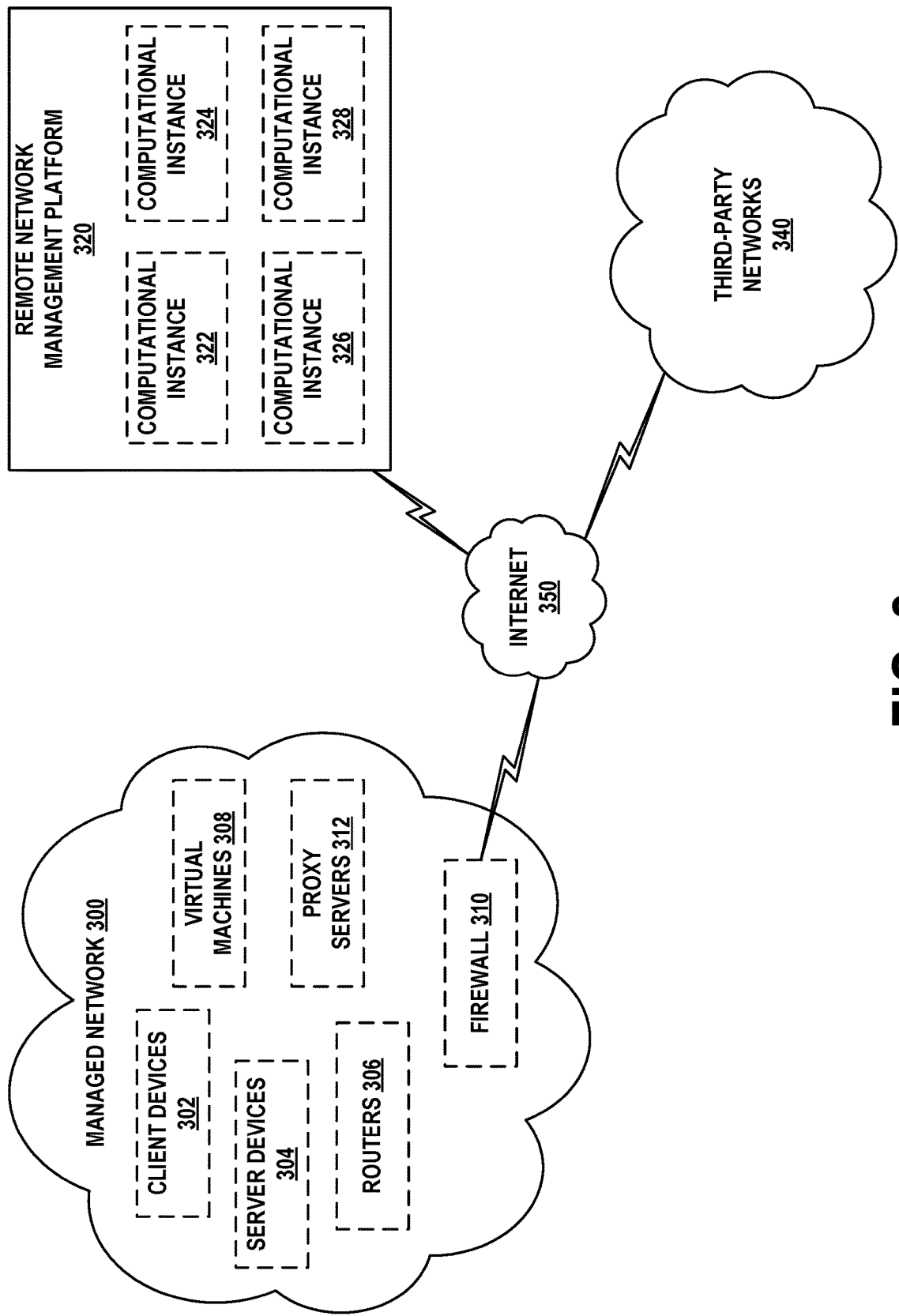
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG.

3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
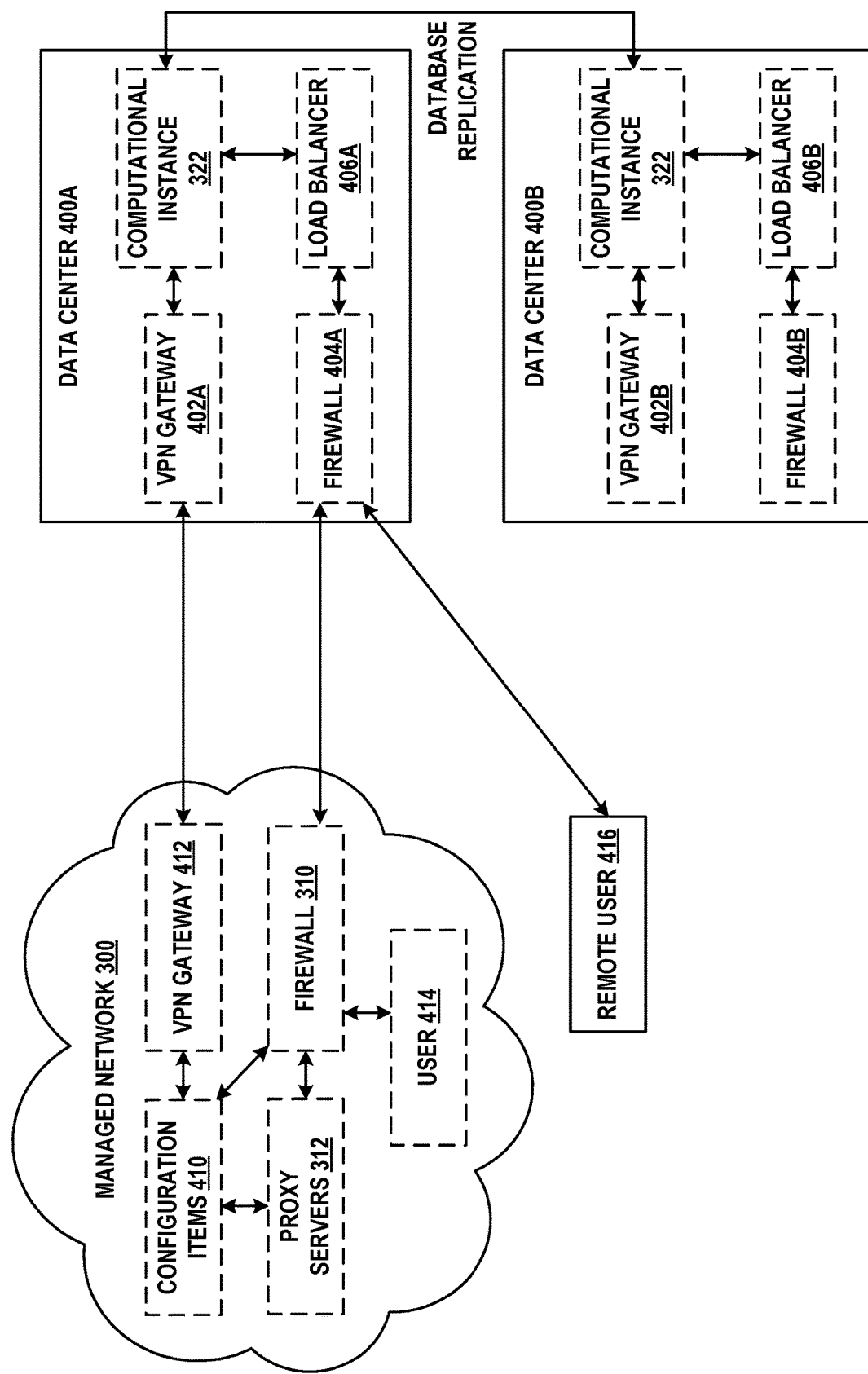
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
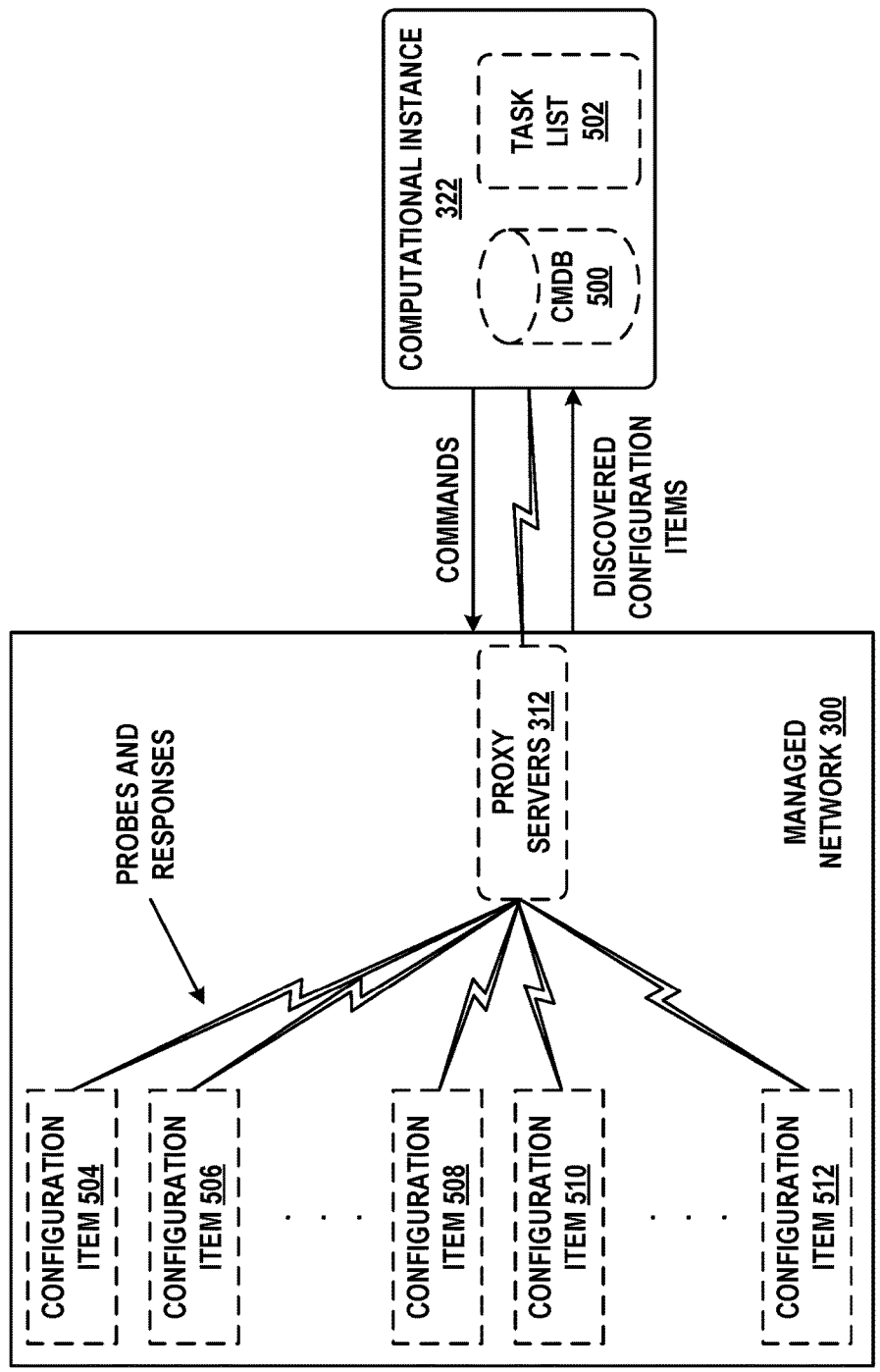
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
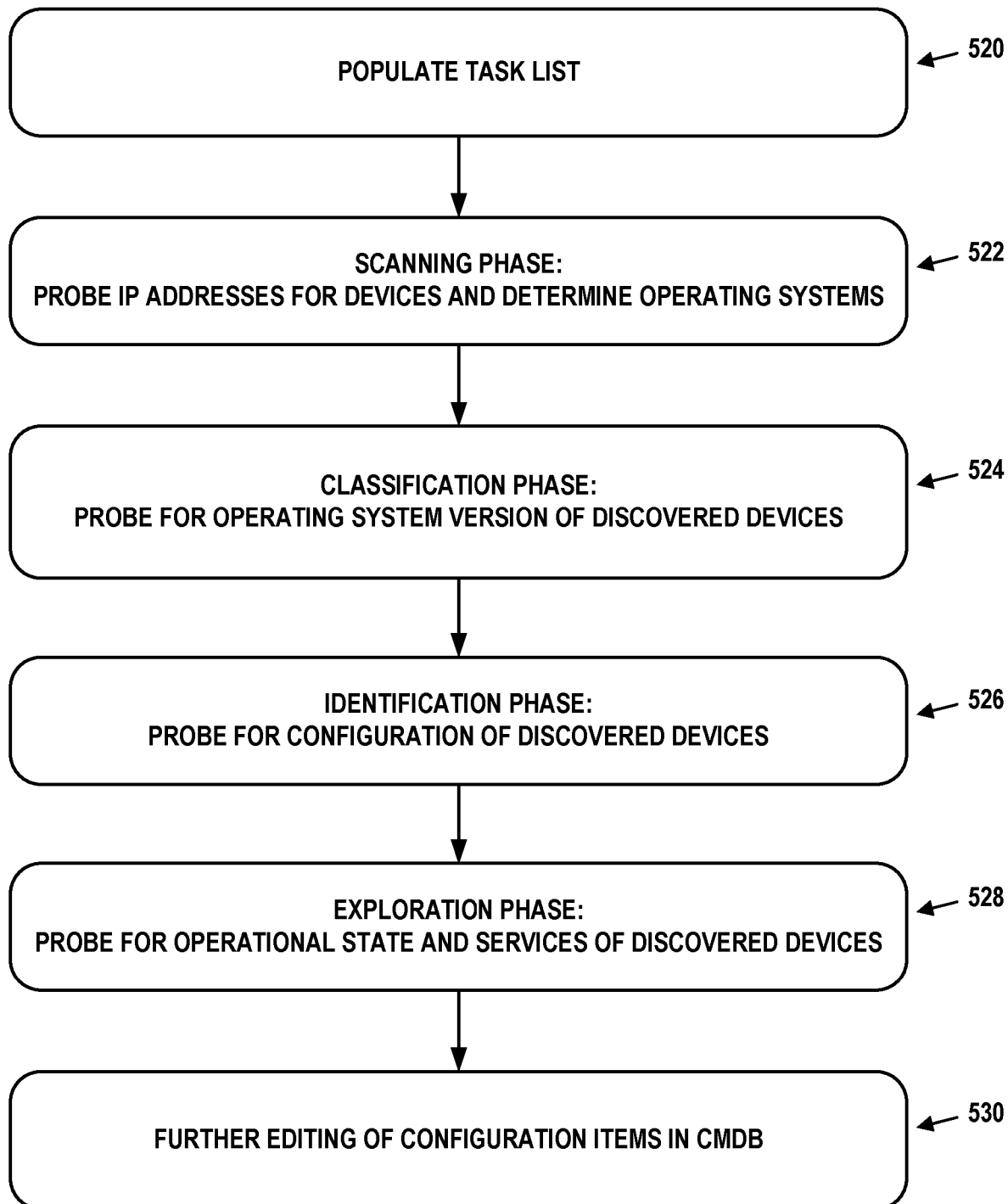
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.0

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Computational Instance Service Architecture

As each computational instance may support numerous web-based applications and portals, it is desirable to service and manage HyperText Transfer Protocol (HTTP) sessions in an efficient fashion. An HTTP session may involve a client device establishing a connection (e.g., a TCP connection) with a web server, transmitting an HTTP request to the web server, and then the web server processing this request and transmitting a result to the client device. In some cases the result may be static web content, and in other cases the result may be dynamically generated during the processing phase. The HTTP session may remain open to serve multiple HTTP requests. Thus, the steps of request transmission, request processing, and transmission of results may repeat some number of times before the session is closed.

Herein, each discrete HTTP request, and the activities carried out in response, may be referred to as a "transaction." Thus, a session may involve one or more related transactions. Furthermore, HTTP requests may include asynchronous JAVASCRIPT® and XML (AJAX) requests, or any other type of data the client device transmits as part of a session.

To process these transactions, each computational instance may include a cluster of two or more web servers optionally configured with servlet containers. The web servers generally provide static content while the servlet containers generate dynamic web content on behalf of the web servers. Thus, transactions involving static web content may be handled by one of the web servers, while transactions involving dynamic content may be passed by a web server to one of the servlet containers. Based on the URL and/or other content associated with the transaction (e.g., provided in the HTTP request), a specific servlet may be identified and executed by the servlet container.

For sake of simplicity, transactions executed by servlets or by way of a servlet container may be referred to as being executed by the web server. In some embodiments, the web server may use other mechanisms (e.g., various scripting languages) to provide dynamic content.

During its execution, the invoked servlet may receive information entered into a web form, store data to and retrieve data from a database, and/or dynamically create web page content, among other operations. For instance, while handling a transaction, a servlet may look up specific data fields in a database, and create web page content that includes the results of these lookups. Then, the web server may transmit the generated web page content to the requesting web client. The servlet container may provide application programming interfaces (APIs) for these and other functions.

In some cases, servlets may be implemented in the JAVA® programming language, and the servlet container may operate one or more JAVA® virtual machines (JVMs) for the servlets. Thus, servlets may include code that is customized to perform specific tasks, and new servlets can be added to the system as desired.

A web server, a servlet container, and/or the underlying operating system may put a limit on the number of servlets that can concurrently execute. This may be implemented as a limit on the number of concurrent threads of execution that can be executing servlets at any given point in time. These threads may be interchangeably referred to as semaphores. Thus, if a servlet container is configured to permit P semaphores, then it will allow at most P threads to concurrently process transactions across all sessions.

Nonetheless, the middleware within a computational instance may place additional restrictions on the number of concurrent transactions. For instance, session management middleware may provide a session context for each HTTP session. This session context may include information about the user (e.g., a userid, whether the user is authenticated, and session encryption parameters) and/or information relevant to the transactions that make up the HTTP session. A session context may be created when an HTTP session begins, and used to maintain state across the transactions thereof. When the HTTP session is terminated, the session context may be deleted.

Given that each transaction could potentially write to this session context, in some embodiments the number of concurrent transactions per session is limited to one, regardless of the number of available semaphores. Doing so avoids introducing potential inconsistencies in the session context due to more than one thread simultaneously writing to the context. Thus, in cases where a client device is accessing a large web page by way of numerous transactions (e.g., AJAX requests), these transactions are served serially. As a consequence, the web page may take a considerable amount of time to fully load even when the system contains resources (e.g., unused semaphores) that would enable the web page to load more rapidly.

While the examples provided herein relate to web-based transactions, embodiments are not limited to just these types of transactions. Thus, the improvements described herein may be applied to any type of client/server or peer-to-peer transactions that would benefit therefrom.

A. Protocol Stack and Session Context Locking

Figure 6:
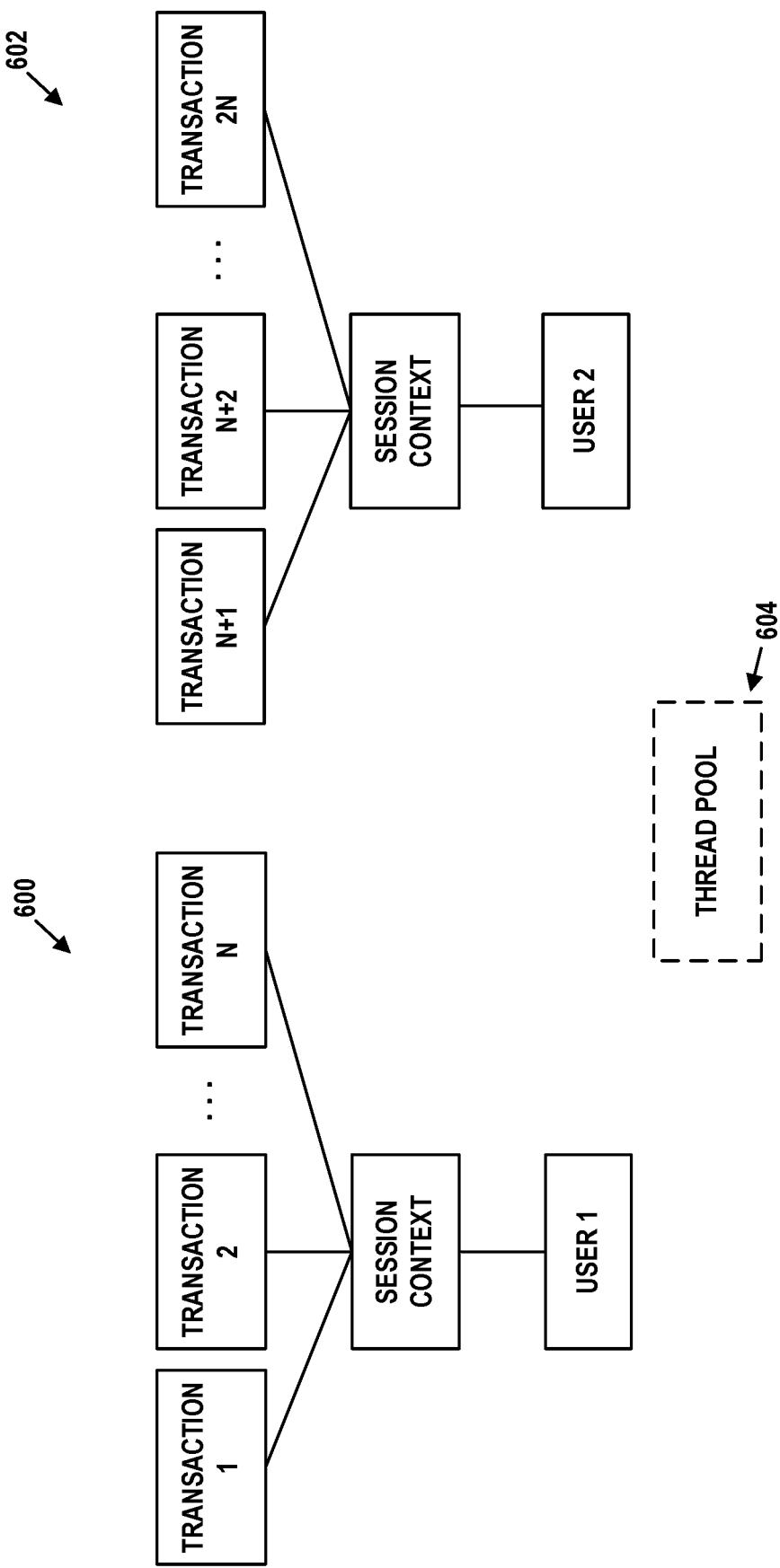
FIG. 6 depicts logical protocol stacks that do not support concurrent transactions, in accordance with example embodiments.

The session and transaction architecture is illustrated as a logical organization of protocol stacks in FIG. 6. Stack 600 is instantiated for user 1 and includes a session context supporting N transactions, numbered 1 through N. Stack 602 is instantiated for user 2 and includes a different session context supporting another N web requests, numbered N+1 through 2N. Thread pool 604 is a system resource including M threads, with access thereto controlled by semaphores. In this architecture, the system requests threads to serve the respective transactions for each session in a serial fashion. Thus, for user 1's session, the system may wait for a transaction being processed to complete before requesting a thread to process another transaction. Likewise, for user 2's session, the system may wait for a transaction being processed to complete before requesting a thread to process another transaction. Thus, while transactions in different sessions can be concurrently processed, at most one transaction at a time can be processed per session. This may be the case, even if there are unallocated threads available, because the session context is not thread-safe.

In order appreciate the differences between a session context design that supports concurrent transactions and one that does not, it is helpful to first understand how transactions are scheduled in situations where transaction concurrency is not supported. Particularly, each transaction is assigned a unique transaction identifier, and these transactions contend for a per-session lock. The contention may be resolved by scheduling access to the lock in the time order of the arrival of the transactions, randomly, or according to some other mechanism. The lock may be represented by an integer value, for instance.

To obtain the lock, a transaction checks to see if the lock is cleared (e.g., set to 0). If so, the transaction claims the lock by writing its transaction identifier to the lock. Doing so allows the system to schedule this transaction to be served by the next available thread, per the semaphore scheduling mechanism. Once the transaction has been served by the thread, the transaction releases the lock (e.g., by writing 0 to the lock) so that another transaction from the session can obtain the lock.

Figure 7:
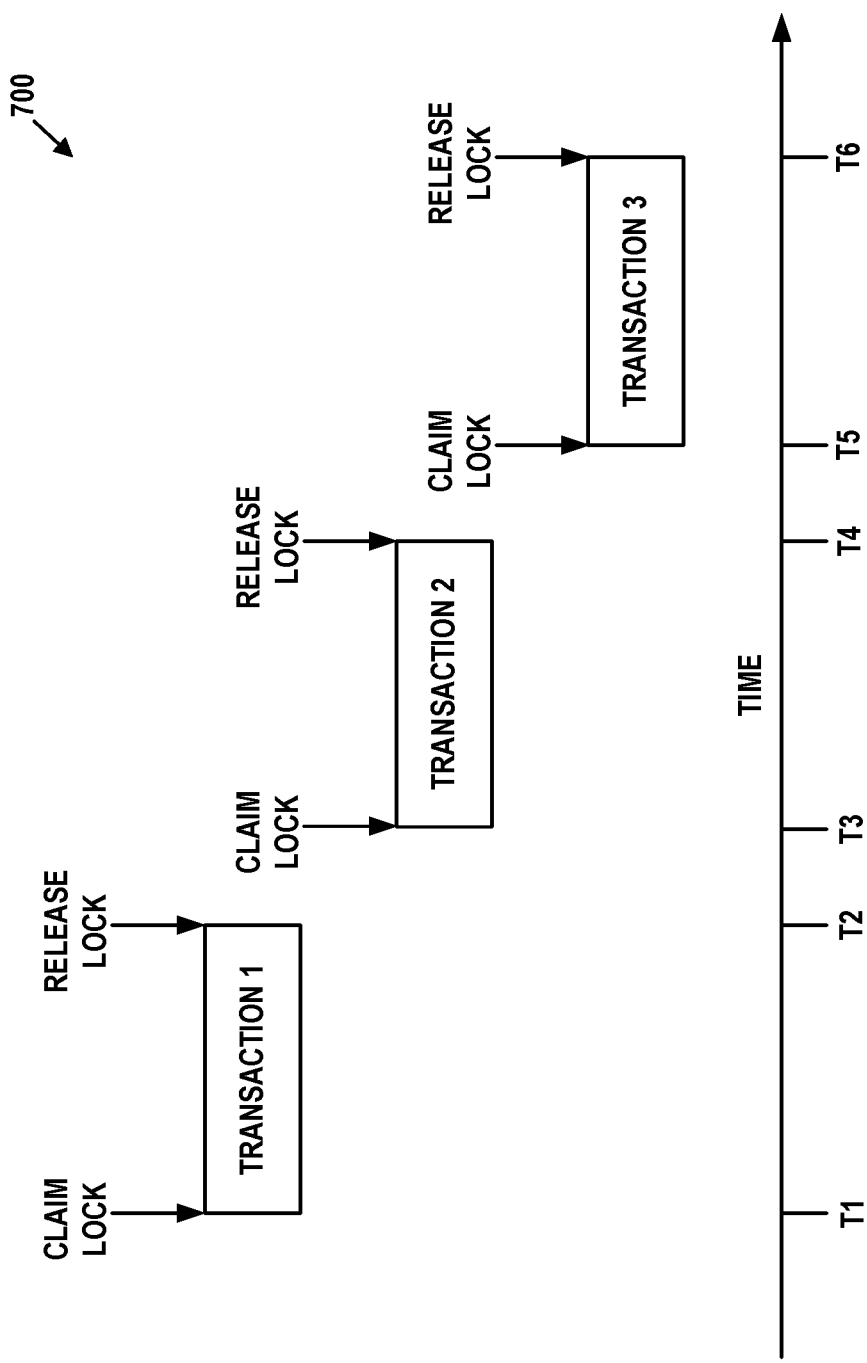
FIG. 7 depicts serial processing of a number of transactions, in accordance with example embodiments.

This procedure is illustrated in FIG. 7. This figure illustrates events 700, which include three transactions (transaction 1, transaction 2, and transaction 3) serially obtaining and releasing a lock associated with a session. In FIG. 7 (and other figures showing similar transaction processing), time flows from left to right.

At time T1, transaction 1 claims the lock by writing its transaction identifier to the lock. Between times T1 and T2, transaction 1 is served by a thread. At time T2, transaction 1 completes processing and releases the lock. Similarly, at time T3, transaction 2 claims the lock by writing its transaction identifier to the lock. Between times T3 and T4, transaction 2 is served by a thread. At time T4, transaction 2 completes processing and releases the lock. Likewise, at time T5, transaction 3 claims the lock by writing its transaction identifier to the lock. Between times T5 and T6, transaction 3 is served by a thread. At time T6, transaction 3 completes processing and releases the lock.

In the embodiment of events 700, a single session context handles all of the transactions and the lock is claimed by each transaction for that transaction's duration. Thus, these transactions are forced to execute one at a time.

B. Supporting Concurrent Transactions Per Session

The limitations illustrated in FIG. 7 can be overcome by adopting a more flexible, and at least partially thread-safe, middleware architecture. In this manner, multiple transactions from the same session can be carried out concurrently in at least some cases. For instance, when a large web page with a significant portion of dynamic content is the subject of a session, the multiple HTTP requests used to retrieve dynamic content for this page can be proceed at least in part concurrently. As a result, page load performance is improved, and in some situations this improvement is dramatic.

1. Architecture

Figure 8A:
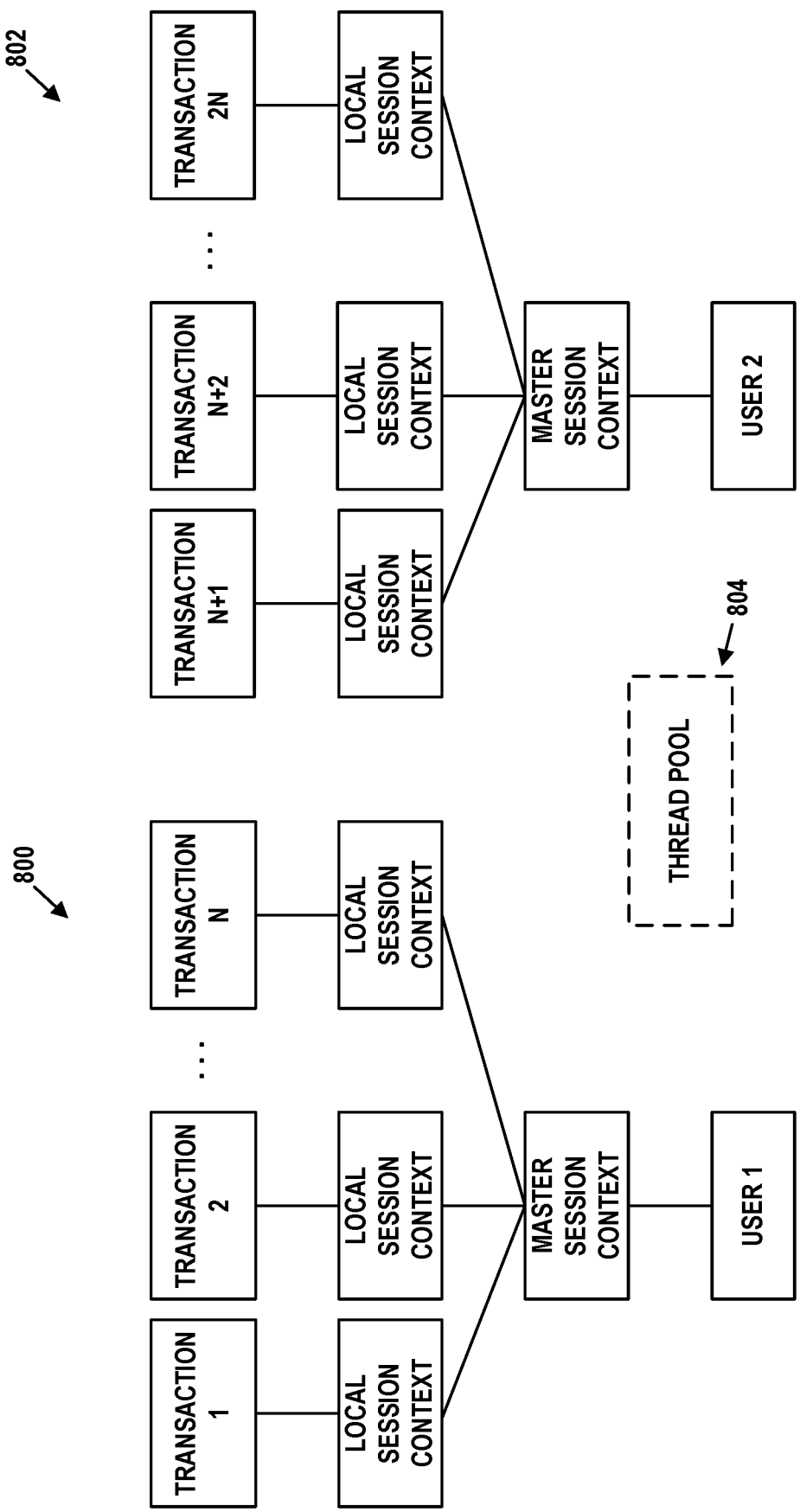
FIG. 8A depicts logical protocol stacks that support concurrent transactions, in accordance with example embodiments.

The improved architecture is shown in FIG. 8A. In this architecture, stack 800 and stack 802 contain a master session context for each session. Thread pool 804 is similar to thread pool 604, in that it is a system resource including M threads, with access thereto controlled by semaphores.

In order to handle transactions concurrently, each transaction is associated with a local session context that is a copy of the master session context. During the transaction, the local session context is read from and updated as needed. When a transaction ends, the local session context is merged back into the master session context. In most cases, the properties from the local session context are incorporated into the master session context, though exceptions to this general rule may exist.

As having a separate local session context per transaction adds a degree of thread-safety, a different thread from thread pool 804 may be allocated for each transaction of a session. Therefore, transactions 1 through N can be carried out concurrently when N is less than or equal to M.

2. Local Session Context Handling

Figure 8B:
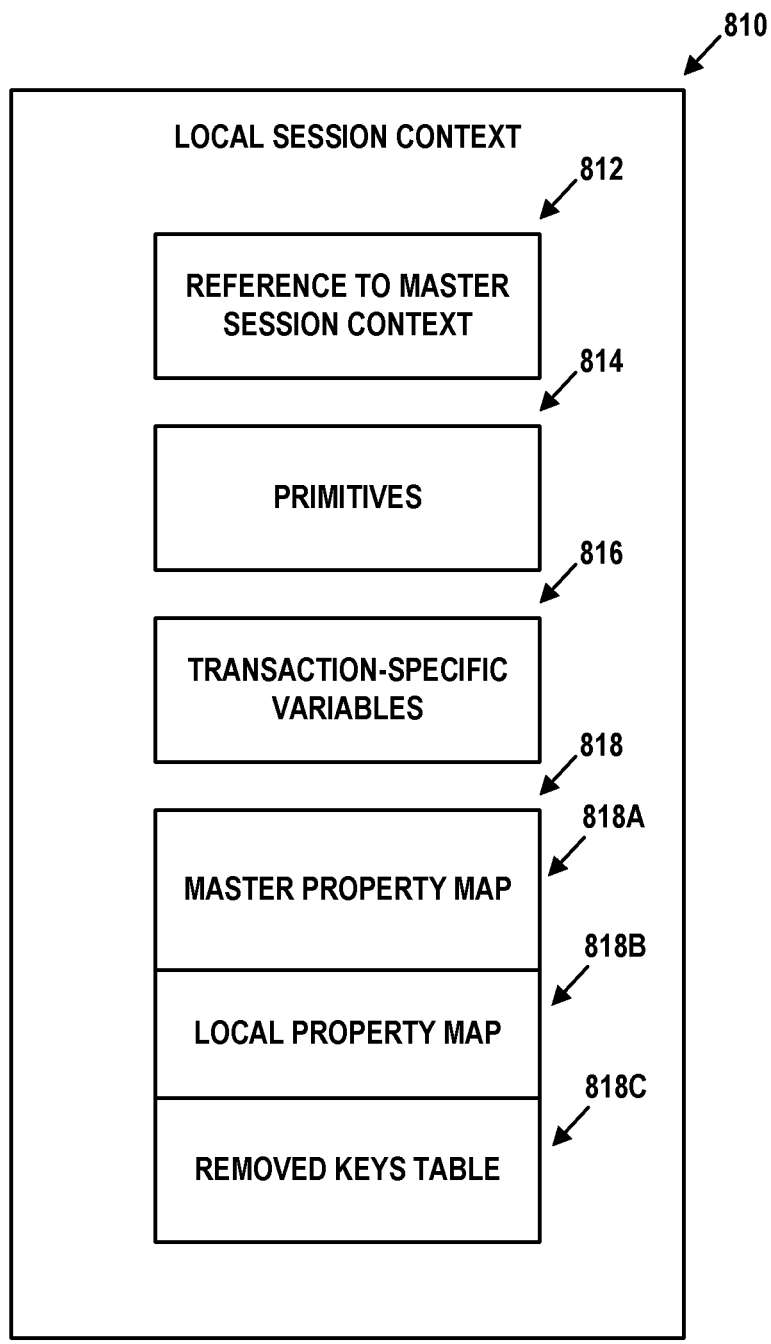
FIG. 8B depicts a data structure representing a local session context, in accordance with example embodiments.

FIG. 8B depicts an example local session context 810. In addition to a reference 812 to the associated master session context, local session context 810 contains three types of variables: primitives 814, transaction-specific variables 816, and property maps 818. Primitives 814 may be copied from the master session context to local session context 810, and then, if any change, the changed primitives are merged with the master session context when the transaction completes. Transaction-specific variables 814 are maintained only in local session context 810, and generally refer to variables created just for use within local session context 810. When local session context 810 completes, these variables are deleted, as they are not needed in the master session context.

Property maps 818 are copied from the master session context to local session context 810, and include a copy 818A of the master property map from the master session context, local property map 818B, and removed keys table 818C. In general, property maps may be sets of associated key-value pairs (e.g., [key1, value1], [key2, value2]). Local property map 818B may be initially empty, but may include any new entries added to property map 818 during a transaction. Removed keys table 818C may also be initially empty, but may include a list of keys removed from property map 818.

When the thread executing the transaction needs to read an element in property map 818, it first attempts to read the element from local property map 818B, and then falls back on reading the element from the copy 818A of the master property map. When removing an element from property map 818, the thread first attempts to remove the element from local property map 818B, and then falls back on removing the element from the copy 818A of the master property map. If the removed element is present in the copy 818A of the master property map, the associated key is added to removed keys table 818C. When merging local session context 810 with the master session context, entries in local property map 818B are added to the property map of the master session context, and properties associated with keys in removed keys table 818C are removed from the property map of the master session context.

Figure 8C:
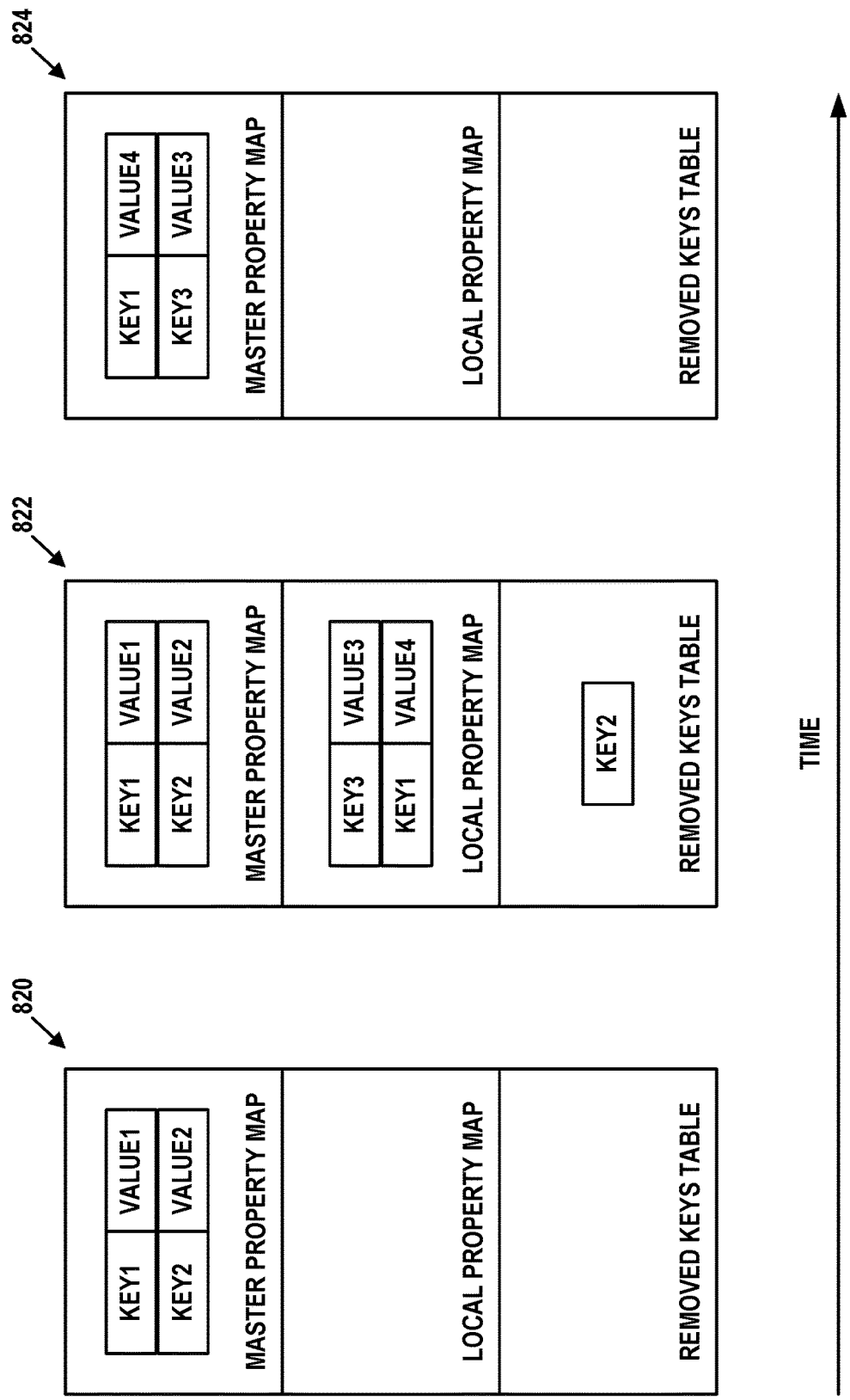
FIG. 8C depicts processing of the data structure of FIG. 8B, in accordance with example embodiments.

This local session context processing is depicted for an example transaction in FIG. 8C. Data structures 820 represent the local session context at the beginning of the transaction. The master property map has been copied from the master session context, and contains two key-value pairs—key1 with value1 and key2 with value2. The local property map and removed keys table are both empty.

Data structures 822 represent the local session context at some point during the processing of the transaction. As shown in the local property map, key1 has been updated with value4, and a new key, key3, has been added with value3. As shown in the removed keys table, key2 has been removed. Notably, in the master property map, key1 is still represented as having its original value and key2 still exists.

Data structures 824 represent data from the local session context after it is merged back into the master session context. The keys listed in the removed keys table are deleted from the master property map (i.e., key2 is deleted). Any updates to keys shown in the local property map are made to the master property map (i.e., the value of key1 is changed from value 1 to value 4). Additionally, any new keys in the local property map are added to the master property map with their associated values (i.e., key3 with value3 is added to the master property map).

In addition to use of these data structures to manage local session context for a transaction, another aspect of enabling concurrent processing of transactions is based on the observation that some (perhaps most) of these transactions can be divided into two consecutive phases. In particular, these include a setup phase which should execute exclusively (i.e., while the lock is claimed by the transaction), and a processing phase that can execute concurrently with other transactions (i.e., after the lock is released by the transaction).

During the setup phase, a master session context for the session is generated if such a context does not already exist. For instance, if the transaction is the first transaction to be carried out by a particular session, the master session context may be generated at this point. If a master session context exists, a copy of it is made and this copy becomes the local session context for the transaction. The generation of a master session context and/or the copying thereof occurs in a non-threaded fashion.

The processing phase may be responsible for parsing the HTTP request (e.g., an HTTP GET or HTTP POST method) associated with the transaction, carrying out any program logic that is used by the transaction (e.g., performing calculations, querying a database if necessary, and generating the result of the HTTP request), and transmitting the result back to the requesting device.

Experimentation has established that, for many transactions, significantly more time is spent in the processing phase than the setup phase. Thus, if a transaction can release the lock after the setup phase is complete but before the processing phase begins (or before the processing phase is too far along), then there can be a significant amount of concurrency between transactions. Nonetheless, not all transactions may be able to be made concurrent in this fashion, and the system may determine, for each transaction, whether that transaction should execute concurrently with other transactions or exclusively.

3. Example Concurrent Transactions

Figure 9A:
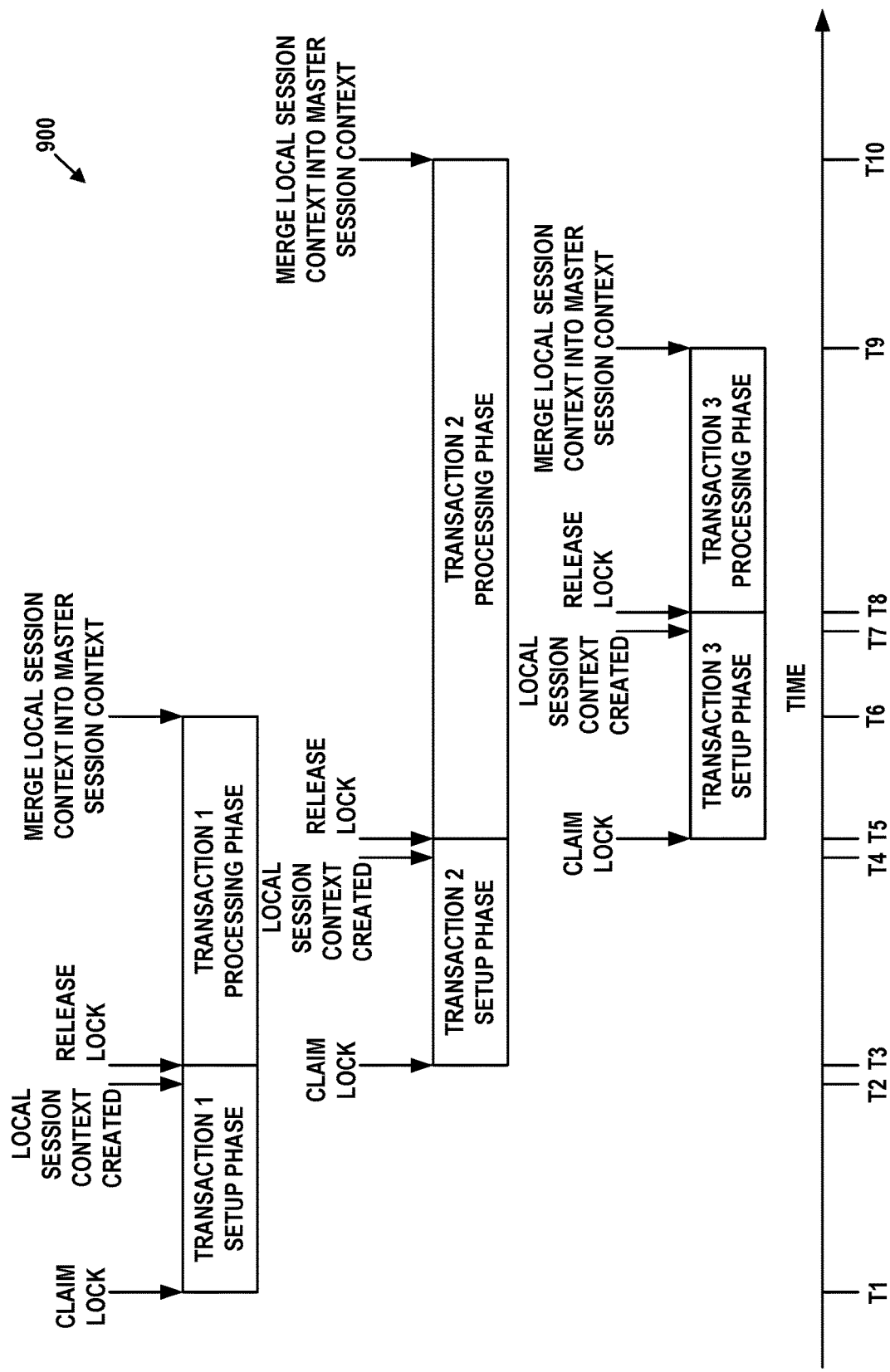
FIG. 9A depicts concurrent processing of a number of transactions, in accordance with example embodiments.

FIG. 9A depicts example transactions being executed concurrently. This figure illustrates events 900, which include three transactions (transaction 1, transaction 2, and transaction 3). At time T1, transaction 1 claims the lock. Between times T1 and T2, the setup phase of transaction 1 is performed. When the setup phase ends at time T2, a local session context has been created for transaction 1. At time T3, which may take place immediately after time T2, the setup phase ends, transaction 1 releases the lock, and the processing phase of transaction 1 begins.

Also at time T3 (or shortly thereafter), transaction 2 claims the lock. Between times T3 and T4, the setup phase of transaction 2 is performed. Thus, processing of transaction 1 and transaction 2 may take place concurrently between times T3 and T6. When the setup phase for transaction 2 ends at time T4, a local session context has been created for transaction 2. At time T5, which may take place immediately after time T4, the setup phase ends, transaction 2 releases the lock, and the processing phase of transaction 2 begins.

At time T6, the processing phase of transaction 1 ends. The system then merges the local session context back into the master session context. In some cases (not depicted in FIG. 9A), the lock may be claimed to avoid two local session contexts from being merged simultaneously with the master session context.

Also at time T5 (or shortly thereafter), transaction 3 claims the lock. Between times T5 and T7, the setup phase of transaction 3 is performed. Thus, processing of transaction 1, transaction 2, and transaction 3 may take place concurrently between times T5 and T6, and processing of transaction 2 and transaction 3 may continue concurrently until time T9. When the setup phase for transaction 3 ends at time T7, a local session context has been created for transaction 3. At time T8, which may take place immediately after time T7, the setup phase ends, transaction 3 releases the lock, and the processing phase of transaction 3 begins.

At time T9, the processing phase of transaction 3 ends and the system merges the local session context of transaction 3 back into the master session context. Likewise, at time T10, the processing phase of transaction 2 ends and the system merges the local session context of transaction 2 back into the master session context. In some cases, the lock may be claimed during these merge procedures to avoid two local session contexts from being merged simultaneously with the master session context.

In some situations, it may be desirable for a transaction to execute non-concurrently. For instance, during its processing phase, the transaction may need exclusive access to data that would otherwise be accessible to other transactions being concurrently executed. An example of this would be a transaction that needs to read and remove a message from a message queue. Allowing other transactions to concurrently read or write to the message queue could lead to inconsistencies in the message queue or between the transactions.

When such an exclusive transaction is queued and awaiting the lock, a flag may be set that prevents any other transaction from being scheduled until the exclusive transaction completes. Additionally, an exclusive transaction can begin only after all other active transactions associated with the session have completed. In some embodiments, the number of active transactions may be maintained in a counter. Therefore, exclusive transaction begins only after the counter reaches zero.

Figure 9B:
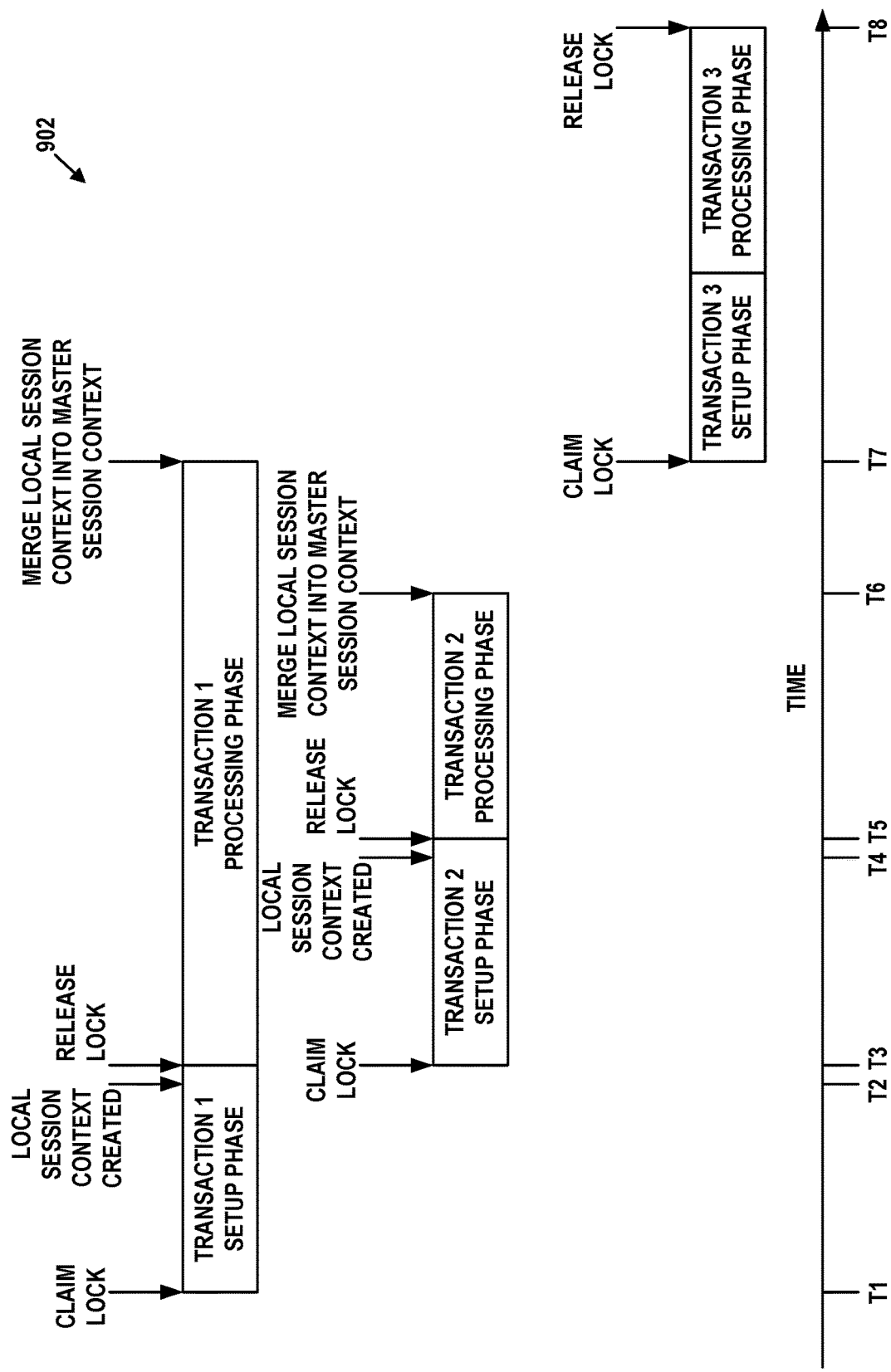
FIG. 9B depicts concurrent processing of a number of transactions, in accordance with example embodiments.

FIG. 9B depicts the scheduling of exclusive and non-exclusive transactions. The scheduling and processing of non-exclusive transaction 1 and transaction 2 are carried out similarly to that of the transactions of FIG. 9A. Transaction 3, on the other hand, is an exclusive transaction. Therefore, it does not attempt to claim the lock when the lock becomes available at time T5, and instead waits until both transaction 1 and transaction 2 complete before claiming the lock at time T7. Transaction 3 maintains its claim on the lock until its processing phase completes at time T8. Note that the exclusivity of transaction 3 is different from the exclusivity of the setup phases of transactions 1 and 2. Particularly, transaction 3 as a whole is executed exclusively.

4. Session Merging

As noted above, when a transaction ends, its local session context may be merged into the master session context. For changed primitives, their new values are written to the master session context. For property maps, the process described in the context of FIG. 8C is followed.

For certain data types within a context, the merge process may be more involved. For instance, a list of data may have a merge rule that specifies that entries can only be added to the list during a merge, and no entries may be deleted. Thus, if the list contains the entries A and B in the master session context and the entries C, D, and E in the local session context, after merging the master session context will contain the entries A, B, C, D, and E.

For other data types, different merge processes may be employed. As an example, a message queue data type may require that a transaction attempting to read a message from the message queue first merge the message queue from the master session context into the local session context, then delete the messages in the master session context, and finally read one or more messages from the local session context. This merge may take place regardless of whether the local session content contains any messages prior to the merge. After the local session context completes processing of the message queue, it may be merged back into the master session context. These procedures allow one transaction to create messages that can be read by another transaction, for example.

Additional possibilities exist. In general, a specific merge process may be applied separately to any type of data or data structure. The merge process may define particular ways of combining values from the master session context and the local session context. Thus, data from the local session context may be incorporated into the master session context based on per data type rules.

5. Improved Semaphore Scheduling

In addition to the improvements above, a new multi-user semaphore scheduling technique is introduced to allocate semaphores fairly amongst multiple users, where the users may be able to obtain more than one semaphore at a time. This avoids a starvation situation where a particular user loading a web page with a large amount of dynamic content prevents other users from obtaining semaphores until the particular user's transactions have all been processed.

In the variations of the system that do not support concurrent transactions per session, transactions from all sessions are placed in a queue in their order of arrival (e.g., the arrival time of a transaction is when the associated HTTP request reaches the web server). When a lock for a particular session is released, the front-most queued transaction for that session is removed from the queue for execution. Since only one transaction per session is executed, threads are inherently distributed amongst sessions in a balanced fashion.

In the embodiments herein that support execution of concurrent transactions per session, this approach would allow transactions from one session to potentially obtain an outsized proportion of the available semaphores, and therefore starve other sessions. Thus, a new semaphore allocation technique should be used.

The general idea for an improved mechanism is to give the lowest priority to transactions from the session that most recently have scheduled a transaction. Thus, transactions are maintained in per-session queues, and transactions are selected for execution from these queues in a fashion that approximates round-robin scheduling. For instance, if a transaction from a particular queue is selected for execution, no further transactions will be selected from this queue until transactions from all other non-empty queues have at least been evaluated for selection.

Figure 10:
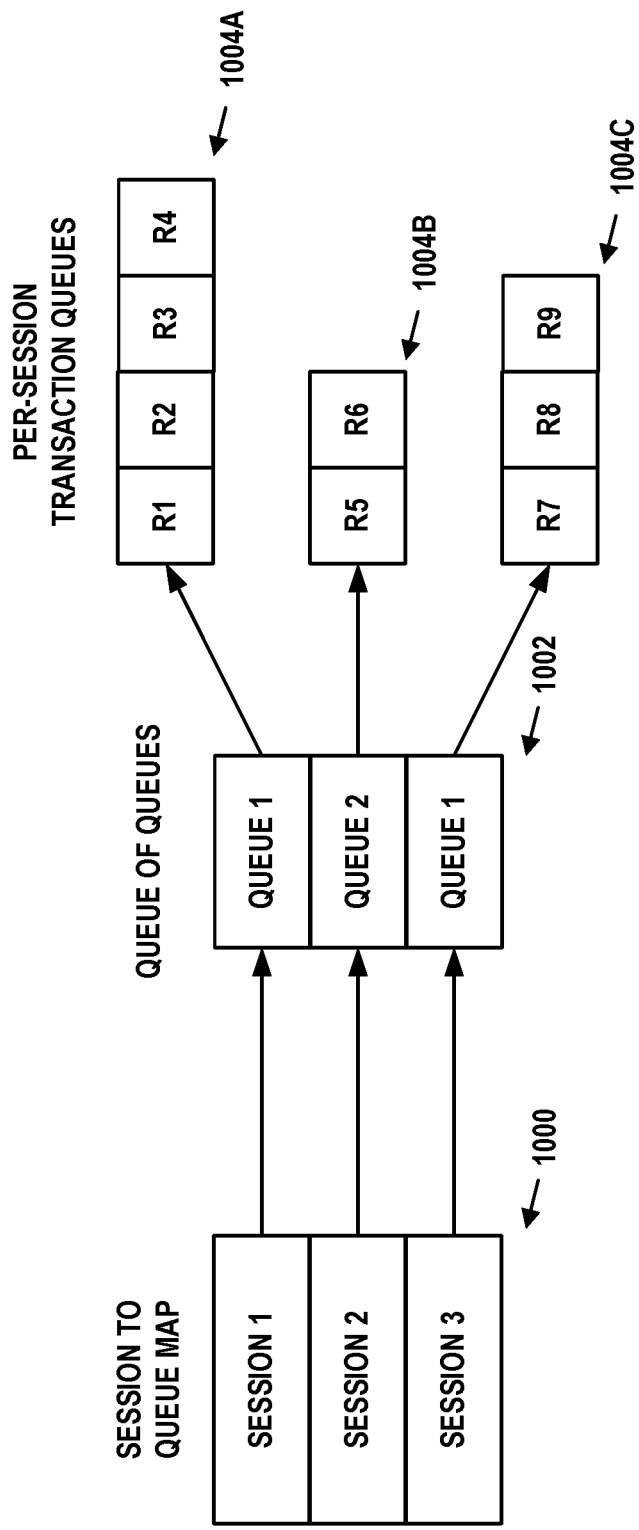
FIG. 10 depicts scheduling of concurrent transactions, in accordance with example embodiments.

This arrangement is illustrated in FIG. 10. Session to queue map 1000 associates sessions with queues of transactions for those sessions. This association is through queue of queues 1002. Per-session transaction queues 1004A, 1004B, 1004C each contain transactions for a single session ordered based on arrival time. Thus, in FIG. 10, transactions R1, R2, R3, and R4 are of session 1, transactions R5 and R6 are of session 2, and transactions R7, R8, and R9 are of session 3.

When a transaction arrives, the appropriate queue is found by looking up the transaction's session in session to queue map 1000. The transaction is placed at the end of this queue. In some cases, an express transaction (e.g., a transaction that is to be processed with high priority) may be placed at the head of the queue.

When a semaphore is available, the system iterates through queue of queues 1002 in order to find a transaction for the semaphore. Starting with the queue at the head of queue of queues 1002, transactions are checked to see whether any can claim the session's lock. If so, the transaction is executed, and the queue is placed at the tail of queue of queues 1002. If not, the transaction remains queued. If no transaction in a particular queue can be executed, the next queue in queue of queues 1002 is checked in the same manner.

In some embodiments, only the transaction at the head of each queue is checked before moving on to check other queues. These latter embodiments operate under the assumption that if this transaction cannot claim the appropriate lock, then the following transactions in the same queue will also fail to do so. On the other hand, if the transaction at the head can claim the lock but has been cancelled, another transaction from the same queue may be selected.

Following this approach (and assuming that all transactions can claim their respective locks when needed), the transactions in FIG. 10 will begin execution in the following order: R1, R5, R7, R2, R6, R8, R3, R9, and R4. Note that this ordering is effectively a round-robin ordering, though when some transactions cannot claim their respective locks, the ordering is no longer round-robin, but still fair.

VI. Example Operations

Figure 11:
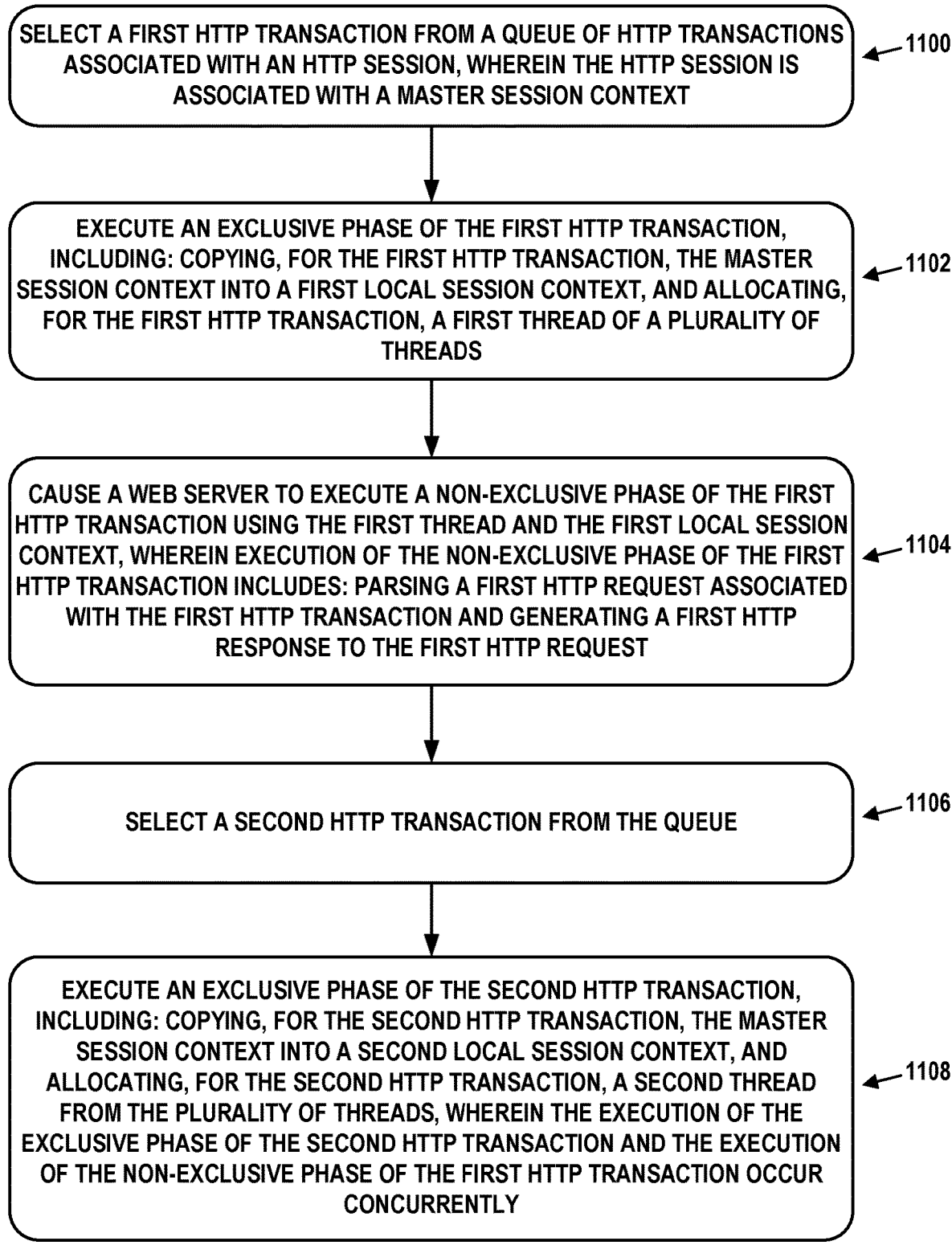
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. In some cases, the process may be carried out, at least in part, by a middleware software module.

The embodiments of FIG. 11 may be simplified by the removal of any one or more of the features shown therein. Further, these embodiments may be combined with features, aspects, and/or implementations of any of the previous figures or otherwise described herein.

Block 1100 of FIG. 11 may involve selecting a first HTTP transaction from a queue of HTTP transactions associated with an HTTP session, where the HTTP session is associated with a master session context.

Block 1102 may involve executing an exclusive phase of the first HTTP transaction, including: copying, for the first HTTP transaction, the master session context into a first local session context, and allocating, for the first HTTP transaction, a first thread of a plurality of threads.

Block 1104 may involve causing a web server to execute a non-exclusive phase of the first HTTP transaction using the first thread and the first local session context, where execution of the non-exclusive phase of the first HTTP transaction includes: parsing a first HTTP request associated with the first HTTP transaction and generating a first HTTP response to the first HTTP request.

Block 1106 may involve selecting a second HTTP transaction from the queue. Block 1108 may involve executing an exclusive phase of the second HTTP transaction, including: copying, for the second HTTP transaction, the master session context into a second local session context, and allocating, for the second HTTP transaction, a second thread from the plurality of threads, where the execution of the exclusive phase of the second HTTP transaction and the execution of the non-exclusive phase of the first HTTP transaction occur concurrently.

Some embodiments may further involve causing the web server to execute a non-exclusive phase of the second HTTP transaction using the second thread and the second local session context. Execution of the non-exclusive phase of the second HTTP transaction may include parsing a second HTTP request associated with the second HTTP transaction and generating a second HTTP response to the second HTTP request. The execution of the non-exclusive phase of the first HTTP transaction and the execution of the non-exclusive phase of the second HTTP transaction may occur concurrently.

Some embodiments may further involve selecting a third HTTP transaction from the queue, and executing an exclusive phase of the third HTTP transaction. This exclusive phase may include: copying, for the third HTTP transaction, the master session context into a third local session context, and allocating, for the third HTTP transaction, a third thread from the plurality of threads. The execution of the exclusive phase of the third HTTP transaction, the execution of the non-exclusive phase of the first HTTP transaction, and the execution of the non-exclusive phase of the second HTTP transaction may occur concurrently.

Some embodiments may further involve executing an exclusive phase of a third HTTP transaction associated with a second HTTP session concurrently with the execution of the exclusive phase of the first HTTP transaction.

Some embodiments may further involve selecting a third HTTP transaction from the queue, determining that the third HTTP transaction is to be executed exclusively, and after the first HTTP transaction and the second HTTP transaction complete, executing the third HTTP transaction without concurrently executing any other HTTP transactions associated with the HTTP session.

In some embodiments, executing the exclusive phase of the first HTTP transaction further includes, before copying the master session context into the first local session context, claiming a lock associated with the HTTP session, and after copying the master session context into the first local session context, releasing the lock. The lock, when claimed, may prevent the lock from being claimed again. Executing the exclusive phase of the second HTTP transaction may further include, before copying the master session context into the second local session context, claiming the lock.

Some embodiments may further involve, after the non-exclusive phase of the first HTTP transaction completes, incorporating data from the local session context into the master session context based on per data type rules.

In some embodiments, the master session context includes a master property map of key-value pairs. Copying the master session context into the first local session context may involve copying the master property map into the local session context, and initializing an empty local property map of key-value pairs and an empty local table of removed keys in the local session context. Execution of the non-exclusive phase of the first HTTP transaction may further include at least one of: (i) in response to a value of a key-value pair in the copy of the master property map being modified, adding an entry to the local property map associating a key of the key-value pair with the value as modified, (ii) in response to a new key-value pair being added to the copy of the master property map, adding an entry to the local property map with the new key-value pair, or (iii) in response to an established key-value pair being in the copy of the master property map being deleted, adding an entry with a key of the established key-value pair to the table of removed keys. Execution of the non-exclusive phase of the first HTTP transaction may further include, after the non-exclusive phase of the first HTTP transaction completes, copying the key-value pairs from the local property map to the master property map, and deleting entries from the master property map that have keys in the table of removed keys.

In some embodiments, the queue is one of a plurality of queues for storing respective sets of HTTP transactions associated with different respective HTTP sessions. A particular queue is selected for processing from the plurality of queues based on one or more of: how recently a queued HTTP transaction from the particular queue has been scheduled for execution, or occupancy of the particular queue.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
   a processor;
   a memory configured to store a master session context of a HyperText Transfer Protocol (HTTP) session, a queue of HTTP transactions associated with the HTTP session, and a representation of a plurality of threads, wherein the master session context includes a master property map of key-value pairs;
   a web server software application, executable by the processor to perform the HTTP transactions using the plurality of threads; and
   a middleware software module executable by the processor to:
   select a first HTTP transaction from the queue,
   execute an exclusive phase of the first HTTP transaction, including: copying, for the first HTTP transaction, the master session context into a first local session context by copying the master property map into the first local session context, initializing an empty local property map of key-value pairs and an empty local table of removed keys in the first local session context, and allocating, for the first HTTP transaction, a first thread of the plurality of threads, wherein the first local session context is specific to the first HTTP transaction, cause the web server to execute a non-exclusive phase of the first HTTP transaction using the first thread and the first local session context, wherein execution of the non-exclusive phase of the first HTTP transaction includes: parsing a first HTTP request associated with the first HTTP transaction and generating a first HTTP response to the first HTTP request, select a second HTTP transaction from the queue, and execute an exclusive phase of the second HTTP transaction, including: copying, for the second HTTP transaction, the master session context into a second local session context, and allocating, for the second HTTP transaction, a second thread from the plurality of threads, wherein the second local session context is specific to the second HTTP transaction, and wherein the execution of the exclusive phase of the second HTTP transaction and the execution of the non-exclusive phase of the first HTTP transaction occur concurrently.

2. The computing system of claim 1, wherein the middleware software module is executable by the processor to:
cause the web server to execute a non-exclusive phase of the second HTTP transaction using the second thread and the second local session context, wherein execution of the non-exclusive phase of the second HTTP transaction includes: parsing a second HTTP request associated with the second HTTP transaction and generating a second HTTP response to the second HTTP request, and wherein the execution of the non-exclusive phase of the first HTTP transaction and the execution of the non-exclusive phase of the second HTTP transaction occur concurrently.

3. The computing system of claim 2, wherein the middleware software module is executable by the processor to:
select a third HTTP transaction from the queue, and
execute an exclusive phase of the third HTTP transaction, including: copying, for the third HTTP transaction, the master session context into a third local session context, and allocating, for the third HTTP transaction, a third thread from the plurality of threads, wherein the execution of the exclusive phase of the third HTTP transaction, the execution of the non-exclusive phase of the first HTTP transaction, and the execution of the non-exclusive phase of the second HTTP transaction occur concurrently.

4. The computing system of claim 3, wherein the middleware software module is executable by the processor to:
execute the exclusive phase of the third HTTP transaction associated with a second HTTP session concurrently with the execution of the exclusive phase of the first HTTP transaction.

5. The computing system of claim 2, wherein the middleware software module is executable by the processor to:
select a third HTTP transaction from the queue,
determine that the third HTTP transaction is to executed exclusively, and
after the first HTTP transaction and the second HTTP transaction complete, execute the third HTTP transaction without concurrently executing any other HTTP transactions associated with the HTTP session.

6. The computing system of claim 1, wherein executing the exclusive phase of the first HTTP transaction includes:
before copying the master session context into the first local session context, claiming a lock associated with the HTTP session, wherein the lock when claimed prevents the lock from being claimed again; and
after copying the master session context into the first local session context, releasing the lock.

7. The computing system of claim 6, wherein executing the exclusive phase of the second HTTP transaction includes:
before copying the master session context into the second local session context, claiming the lock.

8. The computing system of claim 1, wherein the middleware software module is executable by the processor to:
after the non-exclusive phase of the first HTTP transaction completes, incorporating data from the first local session context into the master session context based on per data type rules.

9. The computing system of claim 1, wherein the queue is one of a plurality of queues for storing respective sets of HTTP transactions associated with different respective HTTP sessions, and wherein a particular queue is selected for processing from the plurality of queues based on one or more of: how recently a queued HTTP transaction from the particular queue has been scheduled for execution, or occupancy of the particular queue.

10. A computing system comprising:
a processor:
a memory configured to store a master session context of a HyperText Transfer Protocol (HTTP) session, a queue of HTTP transactions associated with the HTTP session, and a representation of a plurality of threads, wherein the master session context includes a master property map of key-value pairs;
a web server software application, executable by the processor to perform the HTTP transactions using the plurality of threads; and
a middleware software module executable by the processor to:
select a first HTTP transaction from the queue,
execute an exclusive phase of the first HTTP transaction, including:
copying, for the first HTTP transaction, the master session context into a first local session context by at least copying the master property map into the first local session context,
initializing an empty local property map of key-value pairs and an empty local table of removed keys in the first local session context, and
allocating, for the first HTTP transaction, a first thread of the plurality of threads,
cause the web server to execute a non-exclusive phase of the first HTTP transaction using the first thread and the first local session context, wherein execution of the non-exclusive phase of the first HTTP transaction includes: parsing a first HTTP request associated with the first HTTP transaction and generating a first HTTP response to the first HTTP request,
select a second HTTP transaction from the queue, and
execute an exclusive phase of the second HTTP transaction, including: copying, for the second HTTP transaction, the master session context into a second local session context, and allocating, for the second HTTP transaction, a second thread from the plurality of threads, wherein the execution of the exclusive phase of the second HTTP transaction and the execution of the non-exclusive phase of the first HTTP transaction occur concurrently.

11. The computing system of claim 10, wherein execution of the non-exclusive phase of the first HTTP transaction includes at least one of:
  in response to a value of a key-value pair in the copy of the master property map being modified, adding an entry to the local property map associating a key of the key-value pair with the value as modified;
  in response to a new key-value pair being added to the copy of the master property map, adding an entry to the local property map with the new key-value pair; or
  in response to an established key-value pair in the copy of the master property map being deleted, adding an entry with a key of the established key-value pair to the table of removed keys.

12. The computing system of claim 10, wherein execution of the non-exclusive phase of the first HTTP transaction includes:
  after the non-exclusive phase of the first HTTP transaction completes: copying the key value pairs from the local property map to the master property map, and deleting entries from the master property map that have keys in the table of removed keys.

13. A method comprising:
  selecting, by a computing system, a first HyperText Transfer Protocol (HTTP) transaction from a queue of HTTP transactions associated with an HTTP session, wherein the HTTP session is associated with a master session context, wherein the master session context includes a master property map of key-value pairs;
  executing, by the computing system, an exclusive phase of the first HTTP transaction, including: copying, for the first HTTP transaction, the master session context into a first local session context by copying the master property map into the first local session context, initializing an empty local property map of key-value pairs and an empty local table of removed keys in the first local session context, and allocating, for the first HTTP transaction, a first thread of a plurality of threads, wherein the first local session context is specific to the first HTTP transaction;
  causing, by the computing system, a web server to execute a non-exclusive phase of the first HTTP transaction using the first thread and the first local session context, wherein execution of the non-exclusive phase of the first HTTP transaction includes: parsing a first HTTP request associated with the first HTTP transaction and generating a first HTTP response to the first HTTP request;
  selecting, by the computing system, a second HTTP transaction from the queue; and
  executing, by the computing system, an exclusive phase of the second HTTP transaction,
including: copying, for the second HTTP transaction, the master session context into a second local session context, and allocating, for the second HTTP transaction, a second thread from the plurality of threads, wherein the second local session context is specific to the second HTTP transaction, and wherein the execution of the exclusive phase of the second HTTP transaction and the execution of the non-exclusive phase of the first HTTP transaction occur concurrently.

14. The method of claim 13, comprising:
  causing the web server to execute a non-exclusive phase of the second HTTP transaction using the second thread and the second local session context, wherein execution of the nonexclusive phase of the second HTTP transaction includes: parsing a second HTTP request associated with the second HTTP transaction and generating a second HTTP response to the second HTTP request, and wherein the execution of the non-exclusive phase of the first HTTP transaction and the execution of the non-exclusive phase of the second HTTP transaction occur concurrently.

15. The method of claim 14, comprising:
  selecting a third HTTP transaction from the queue; and
  executing an exclusive phase of the third HTTP transaction, including: copying, for the third HTTP transaction, the master session context into a third local session context, and allocating, for the third HTTP transaction, a third thread from the plurality of threads, wherein the execution of the exclusive phase of the third HTTP transaction, the execution of the non-exclusive phase of the first HTTP transaction, and the execution of the non-exclusive phase of the second HTTP transaction occur concurrently.

16. The method of claim 14, comprising:
  selecting a third HTTP transaction from the queue,
  determining that the third HTTP transaction is to executed exclusively, and
  after the first HTTP transaction and the second HTTP transaction complete, executing the third HTTP transaction without concurrently executing any other HTTP transactions associated with the HTTP session.

17. The method of claim 13, wherein executing the exclusive phase of the first HTTP transaction includes:
  before copying the master session context into the first local session context, claiming a lock associated with the HTTP session, wherein the lock when claimed prevents the lock from being claimed again; and
  after copying the master session context into the first local session context, releasing the lock.

18. The method of claim 17, wherein executing the exclusive phase of the second HTTP transaction includes:
  before copying the master session context into the second local session context, claiming the lock.

19. The method of claim 13, comprising:
  after the non-exclusive phase of the first HTTP transaction completes, incorporating data from the first local session context into the master session context based on per data type rules.

20. The method of claim 13, wherein execution of the non-exclusive phase of the first HTTP transaction includes at least one of:
  in response to a value of a key-value pair in the copy of the master property map being modified, adding an entry to the local property map associating a key of the key-value pair with the value as modified;
  in response to a new key-value pair being added to the copy of the master property map, adding an entry to the local property map with the new key-value pair; or
  in response to an established key-value pair in the copy of the master property map being deleted, adding an entry with a key of the established key-value pair to the table of removed keys.

21. The method of claim 13, wherein execution of the non-exclusive phase of the first HTTP transaction includes:
  after the non-exclusive phase of the first HTTP transaction completes: copying the key value pairs from the local property map to the master property map, and deleting entries from the master property map that have keys in the table of removed keys.

22. An article of manufacture including a non-transitory computer readable medium, having stored thereon program instructions that, upon execution by a computing system, cause the computing system to perform operations comprising:

selecting a first HyperText Transfer Protocol (HTTP) transaction from a queue of HTTP transactions associated with an HTTP session, wherein the HTTP session is associated with a master session context, wherein the master session context includes a master property map of key-value pairs;

executing an exclusive phase of the first HTTP transaction, including: copying, for the first HTTP transaction, the master session context into a first local session context by copying the master property map into the first local session context, initializing an empty local property map of key-value pairs and an empty local table of removed keys in the first local session context, and allocating, for the first HTTP transaction, a first thread of a plurality of threads, wherein the first local session context is specific to the first HTTP transaction;

causing a web server to execute a non-exclusive phase of the first HTTP transaction using the first thread and the first local session context, wherein execution of the non-exclusive phase of the first HTTP transaction includes: parsing a first HTTP request associated with the first HTTP transaction and generating a first HTTP response to the first HTTP request;

selecting a second HTTP transaction from the queue; and executing an exclusive phase of the second HTTP transaction, including: copying, for the second HTTP transaction, the master session context into a second local session context, and allocating, for the second HTTP transaction, a second thread from the plurality of threads, wherein the second local session context is specific to the second HTTP transaction, and wherein the execution of the exclusive phase of the second HTTP transaction and the execution of the non-exclusive phase of the first HTTP transaction occur concurrently.

23. The article of manufacture of claim 22, wherein execution of the non-exclusive phase of the first HTTP transaction includes at least one of:

in response to a value of a key-value pair in the copy of the master property map being modified, adding an entry to the local property map associating a key of the key-value pair with the value as modified;

in response to a new key-value pair being added to the copy of the master property map, adding an entry to the local property map with the new key-value pair; or in response to an established key-value pair in the copy of the master property map being deleted, adding an entry with a key of the established key-value pair to the table of removed keys.

24. The article of manufacture of claim 22, wherein execution of the non-exclusive phase of the first HTTP transaction includes:

after the non-exclusive phase of the first HTTP transaction completes: copying the key value pairs from the local property map to the master property map, and deleting entries from the master property map that have keys in the table of removed keys.

* * * * *